United States Patent [19]

Pan

[11] Patent Number: 5,611,009
[45] Date of Patent: Mar. 11, 1997

[54] 1 X N ELECTROMECHANICAL OPTICAL SWITCH

[75] Inventor: Jing-Jong Pan, San Jose, Calif.

[73] Assignee: E-Tek Dynamics, Inc., San Jose, Calif.

[21] Appl. No.: 512,752

[22] Filed: Aug. 9, 1995

Related U.S. Application Data

[63] Continuation of Ser. No. 307,114, Sep. 16, 1994, Pat. No. 5,479,541, which is a continuation of Ser. No. 74,765, Jun. 10, 1993, Pat. No. 5,359,683.

[51] Int. Cl.$^6$ ...................................................... G02B 6/32
[52] U.S. Cl. .................................. 385/22; 385/34; 385/38
[58] Field of Search ........................... 385/15, 16, 20–23, 385/25, 26, 31, 33, 34, 35, 38, 74

[56] References Cited

U.S. PATENT DOCUMENTS

| | | | |
|---|---|---|---|
| 4,239,332 | 12/1980 | Inbar | 385/22 |
| 4,290,667 | 9/1981 | Chown | 385/96.18 |
| 4,378,144 | 3/1983 | Duck et al. | 350/96.18 |
| 4,420,219 | 12/1983 | Muchel | 350/96.18 |
| 4,611,885 | 9/1986 | Boirat | 350/96.2 |
| 4,641,915 | 2/1987 | Asakawa et al. | 350/96.18 |
| 4,818,052 | 4/1989 | Le Pesant et al. | 350/96.15 |
| 4,896,935 | 1/1990 | Lee | 350/96.2 |
| 4,961,622 | 10/1990 | Gorman et al. | 350/96.18 |
| 5,359,683 | 10/1994 | Pan | 385/22 |
| 5,420,946 | 5/1995 | Tsai | 385/22 |
| 5,479,541 | 12/1995 | Pan | 385/22 |

OTHER PUBLICATIONS

Richard Syms and John Cozeus, *Optical Guided Waves and Devices*, McGraw–Hill Book Co., London, 1992, pp. 189–191.

*Primary Examiner*—John Ngo
*Attorney, Agent, or Firm*—Townsend and Townsend and Crew LLP

[57] ABSTRACT

An improved optical switch having a first optical fiber and a plurality of N optical fibers. The first optical fiber forms an optical path with any one of the N optical fibers by an alignment of a longitudinal axis of an end of the first optical fiber with a longitudinal axis of an end of the one of N optical fibers. A switch in optical path is performed by a relative movement of the first optical fiber with respect to the N optical fibers for a realignment of the longitudinal axis of the end of the first optical fiber with a longitudinal axis of an end of another one of the N optical fibers.

15 Claims, 4 Drawing Sheets

1 X N ELECTROMECHANICAL OPTICAL SWITCH

This is a continuation of application Ser. No. 08/307,114 filed Sep. 16, 1994, now U.S. Pat. No. 5,479,541, which is a continuation of application Ser. No. 08/074,765, filed Jun. 10, 1993, now U.S. Pat. No. 5,359,683.

BACKGROUND OF THE INVENTION

The present invention is related to the field of optical switches and, more particularly, to optical switches in which the switching function is effected by electromechanical devices.

In a 1×N optical switch, a single optical fiber forms an optical path with an optical fiber selected from N optical fibers. Thus a signal on the single optical fiber is transmitted to the selected fiber. Similarly a signal on the selected fiber is passed to the single optical fiber. A switch permits the optical connection to be changed from the selected fiber to another of the N fibers.

In electromechanical 1×N optical switches, the switching operation is effected by the movement of an end of the single optical fiber relative to the ends of the N optical fibers. To form an optical path, the end of the single optical fiber is aligned with the end of the selected fiber from the N fibers. In such systems alignment of the fiber ends is critical and the much effort is required with the electromechanical drive devices, such as motors and their movements, to ensure precise and reproducible alignment of the single fiber with each of the N optical fibers. Nonetheless, performance of such switches has remained poor with use restricted to multimode optical fibers. In present day optical networks it is often desirable to use single mode optical fibers.

The present invention presents an electromechanical 1×N optical switch with high optical performance. Moreover, with the present invention single mode optical fibers may be used.

SUMMARY OF THE INVENTION

The present invention provides for an improved optical switch having a first optical fiber and a plurality of N optical fibers. The first optical fiber forms an optical path with any one of the N optical fibers by an alignment of a longitudinal axis of an end of the first optical fiber with a longitudinal axis of an end of the one of N optical fibers. A switch in optical path is performed by a relative movement of the first optical fiber with respect to the N optical fibers for a realignment of the longitudinal axis of the end of the first optical fiber with a longitudinal axis of an end of another one of the N optical fibers.

The improvement has a first collimating GRIN lens having a longitudinal axis coincident with the longitudinal axis of the first optical fiber and having a surface adjacent to said end of the first optical fiber, and a plurality of N collimating GRIN lenses, each having a longitudinal axis coincident with a longitudinal axis of one of the N optical fibers and having a surface adjacent to the end of the N optical fibers. This improvement allows the first optical fiber to form an optical path with any one of the plurality of N optical fibers by an alignment of a longitudinal axis of the first GRIN lens with a longitudinal axis of one of the plurality of N GRIN lenses to enhance optical performance.

Alternatively, collimating aspheric lenses may be used instead of GRIN lenses. For each of the optical fibers, an aspheric lens is fixed in front on the optical fiber with the longitudinal axis of the optical fiber aligned with the lens' optical axis. The end of the optical fiber is fixed at the focal point of the aspheric lens.

DETAILED DESCRIPTION OF PREFERRED EMBODIMENTS

Figure 1A:
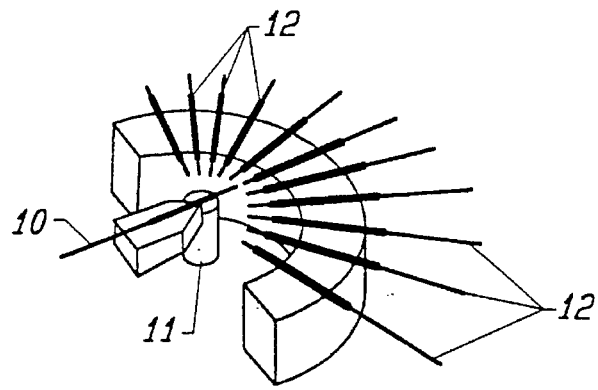
FIG. 1A illustrates an arrangement of an electromechanical 1×N optical switch in the prior art.

FIG. 1 shows an organization of an electromechanical 1×N optical switch in which N optical fibers 12 are arranged in an arc of a circle around a central single fiber 10. With a drive mechanism 11, such as a step motor, the fiber 10 rotates into alignment with one of the N optical fibers 12. With alignment, an optical (light) signal can pass from the fiber 10 to the aligned fiber 12, or from the fiber 12 to the fiber 10.

Other arrangements of the fibers are possible, but the goal of any such arrangement is to ensure that fiber alignment can be made in a precise and reproducible manner with each one of the N optical fibers. Nonetheless, the mechanical movement of the single fiber 10 with respect to the N optical fibers 12 raises problems due to mechanical complexities and costs when high degrees of precision and reproducibility are required.

Figure 1B:
FIG. 1B shows the alignment of the optical fibers to form an optical path in the switch of FIG. 1A.

FIG. 1B helps illustrate these problems. Light from each of the ends of fibers 10 and 12 naturally diverges. In a typical step-index, single mode fiber, the light signal diverges at an angle of 7.5°, or 3.25° from the fiber's longitudinal axis, the general direction of the signal in the fiber. For a step-index, multimode fiber, the divergence angle is 11.5°. The result is that the transmission between the single fiber 10 and each of the N fibers 12 is highly dependent upon the separation distance between the fiber ends. Furthermore, the insertion loss in the transmission between the two fibers 10 and 12 is high from the diverging light signal. The fiber ends should be as close as possible.

Furthermore, transmission between the ends of the two fibers 10 and 12 is dependent upon alignment, angular and displacement, of the fiber ends and the insertion loss rises with any misalignment. Angular alignment refers to the amount by which the longitudinal axes of each of the fibers 10 and 12 at the ends of the fibers are not parallel to each other. Displacement alignment refers to the amount by which the longitudinal axes of each of the fibers 10 and 12 at the ends of the fibers, even if parallel to each other, are separated. Ideal alignment is zero in both cases.

Figure 2:
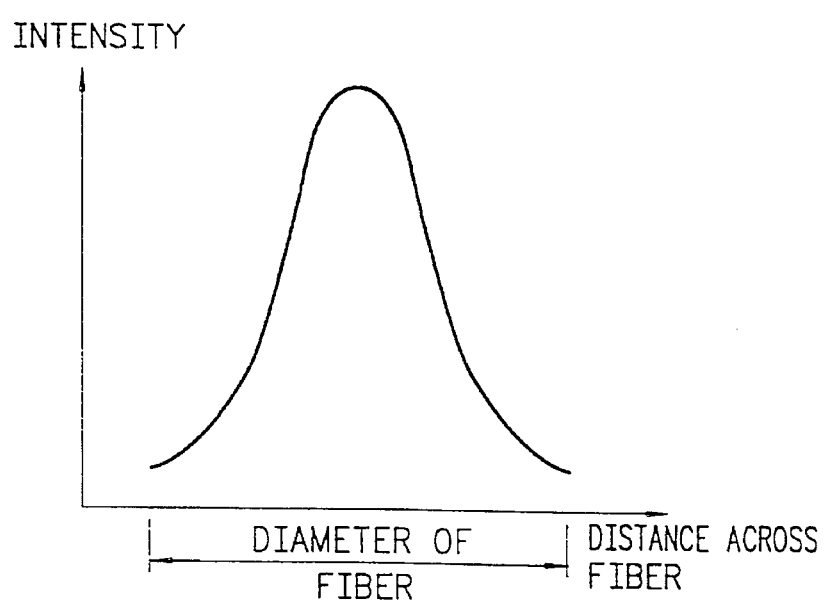
FIG. 2 is a representational graph of the light intensity of a signal in an optical fiber across its diameter.

FIG. 2, which shows the general distribution of the intensity of a light signal over the diameter of the core of a step-index fiber, helps illustrate the criticality of alignment. Most of the light appears in only a fraction of the diameter, thus indicating that alignment tolerances are reduced from the already small diameters of optical fibers. Typical multimode fibers have core diameters from 50–100 μm, while single mode fibers have even smaller core diameters, 4–10 μm. The difficulty in handling the small dimensions of the single mode fibers have kept 1×N electromechanical optical switches, as described above, for single mode fibers from the market.

In contrast, the present invention improves the optical performance of 1×N electromechanical switches that even single mode fibers may be used. The light from an end of one of the transmitting fibers 10 or 12 is expanded by more than an order of magnitude and collimated into a relatively large beam with near-zero divergence angle. The end of the receiving fiber 12 or 10 recollimates and focuses the large beam on the fiber. The critical alignment problem is changed to the alignment of comparatively large collimated beams. Less sensitivity of the optical coupling efficiency, or the insertion loss, to displacement misalignment may be obtained. Since alignment is less sensitive, repeatability is also easier.

Figure 3:
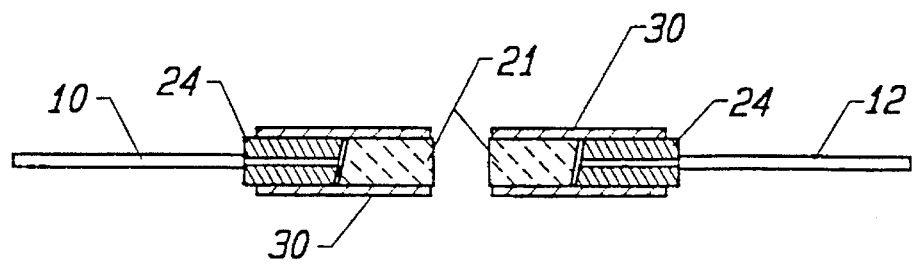
FIG. 3 is a cross-section of aligned optical fibers in an 1×N optical switch according to one embodiment of the present invention.

Quarter-pitch or near quarter-pitch GRIN lenses arranged at the ends of each of the fibers 10 and 12 have been found to be very efficacious as collimators. FIG. 3 shows the arrangement of a quarter-pitch GRIN (GRaded INdex) lens 21 is placed in front of the end of the single fiber 10 and one of the N fibers 12. It is understood that a quarter-pitch GRIN lens is placed in front of each of the N optical fibers 12. The longitudinal axis of each of the GRIN lenses 21 are aligned with the longitudinal axis of its corresponding optical fibers 10 and 12.

The fiber 10 and 12 are sealed in a cylindrical glass ferrule 24. For improved optical performance, the end 24A of the ferrule 24 and the end of the fiber 10 and 12 are slant-polished so that the tip of the fiber does not end with a surface perpendicular to the longitudinal axis of the fiber. The ferrule 24 (holding the fiber 10 or 12) and the cylindrical GRIN lens 21 are aligned and held in place by a hollow cylindrical holder 30.

Figure 4:
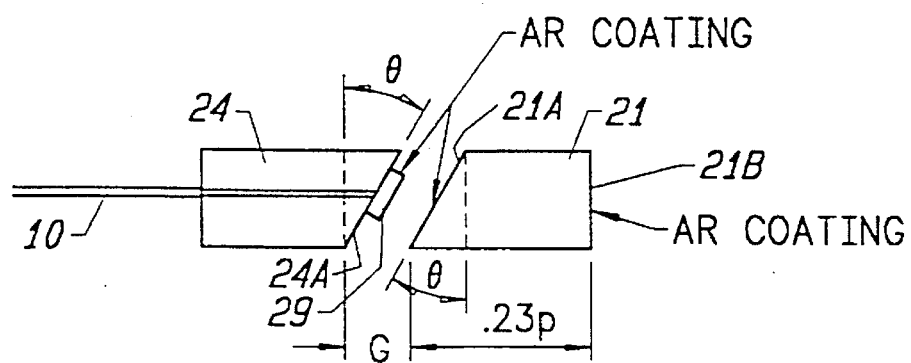
FIG. 4 details the cross-section of FIG. 3.

FIG. 4 shows the details of this arrangement with the single fiber 10 as an example. The holder 30 is left out for drawing clarity. Furthermore, in the drawings it should be noted that where the same or very similar element is used, the same reference number is used for clarity's sake. A slight slant is made by polishing an end surface 24A of the ferrule 24 (and the end of the fiber 10) at a slight angle θ, 8° to 12°, from perpendicularity to the longitudinal axis of the fiber 10. This is shown in exaggerated fashion in FIG. 4. The ferrule end surface 24A and the fiber end 10B are covered with an anti-reflection (AR) coating. An anti-reflection material, such as MgF, may be used.

Alternatively, the slant-polished end of the fiber 10 is covered by a window element 29, which is covered with an anti-reflection coating. The element 29 is formed by a thin pane of glass of 250 μm thickness. The glass, having an index of refraction of 1.46, is coated with an anti-reflection material. The thickness of the anti-reflection material can then be tested on the pane. If the coating on the pane is satisfactory, the pane is then diced into tiny windows 29 of 1.2 mm×1.2 mm dimensions. One of the windows 29 is mounted over the end of the fiber 20 on the slant-faced end of the glass ferrule 24. A clear epoxy such as Norland 62 from Norland Products, Inc. of New Brunswick, N.J., may be used.

The face 21A of GRIN lens 21 facing the fiber 10 is also reciprocally slant-polished at the angle θ and GRIN lens 21 rotated so that the face 21A is aligned in a complementary fashion with the end of the glass ferrule 24. As in the case of the window 29 (and the single fiber 10), the slant-polished face 21A and back face 21B of the GRIN lens 21 are also anti-reflection coated over a sufficient spectral bandwidth to reduce insertion loss, as well as to minimize reflections at the surfaces.

The ferrule 24 (and the fiber 10) is separated from the GRIN lens 21 by a gap G. The gap, G, should be sufficiently large (>0.05 mm) in order to avoid undesired Fabry-Perot type interference. Such interference is extremely temperature dependent and causes thermal instability over a wide operational temperature range. It is important that such interference be avoided.

Figure 5:
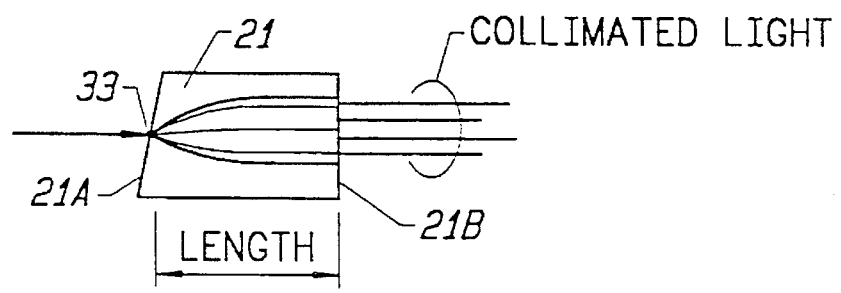
FIG. 5 illustrates the idealized operation of a GRIN lens in FIG. 4.

FIG. 5 illustrates the idealized operation of the GRIN lens 21. Light from the fiber 10 strikes the GRIN lens front surface 31A at a point 33. In the GRIN lens 21 the light is bent by the graded index of the GRIN lens to leave the back surface 21B collimated. The GRIN lens 21 spreads out the light concentrated in a fiber 10 or 12 into a beam having a relatively large diameter. For example, light concentrated over a fraction of a 6 μm diameter core, see FIG. 2, is spread into a collimated beam of a 1.8 mm diameter. Alignment is made easier now with the increased tolerances.

As is known, collimation of light from a point source is performed by a GRIN lens having a quarter-pitch length. However, it has been found that using a GRIN lens of a length 0.23 times the pitch is more effective than a GRIN lens of a length 0.25 times the pitch.

Table I below shows the experimental results of the optimum relationships between the angle θ, the gap G, and the pitch of the GRIN lens 21:

TABLE I

| θ | G (mm) | Pitch of GRIN Lens | Performance |
| --- | --- | --- | --- |
| 8° | 1.10 | 0.18 | Low Return Loss (<−60 dB) Low Insertion Loss* (<0.35 dB) |
| 10° | 0.250 | 0.23 | Low Return Loss (<−65 dB) Low Insertion Loss* (<0.35 dB) |

*Total insertion loss of two sets of slanted-polished GRIN lenses, fibers and windows.

The reason for the discrepancy between the theoretically predicted optimum GRIN lens of 0.25 pitch and the actually observed optimum GRIN lens of 0.23 pitch is believed to be that, in practical terms, the light from a fiber does not appear as a true point source at the surface on the GRIN lens. This appears to be true whether the GRIN lens front surface 31 is flat or slanted.

This discrepancy illustrates the problems between theory and the practical implementation of optical isolators. The collimation of light from the fiber depends upon many factors, including the numeral aperture of the fiber, the slant angle θ, the material (refractive index), thickness and anti-reflection coating of the window 29, the gap G, and the characteristics of the GRIN lens 21. Theoretical analysis and computation may be calculated with formulas, such as given in "Coupling Characteristics Between Single-Mode Fiber and Square Law Medium," R. Kishimoto and M. Koyama, *IEEE Transactions on Microwave Theory and Techniques,* June 1982, pp. 882–893. However, theory does not necessarily lead to practical solutions.

Another embodiment of the present invention uses aspheric lenses instead of the GRIN lenses discussed above. An aspheric lens is formed by opposing facets, each of which have rotational symmetry about the optical axis of the lens. Aspheric lenses have the advantage that, like the GRIN lens, a single lens can perform the collimating (or focussing) function. The arrangement of an aspheric lens with each fiber 10 and 12 can be made without undue complexity and maintained with reliability. Furthermore, present day aspheric lens with good optical performance are relatively inexpensive with many suppliers available.

Figure 6A:
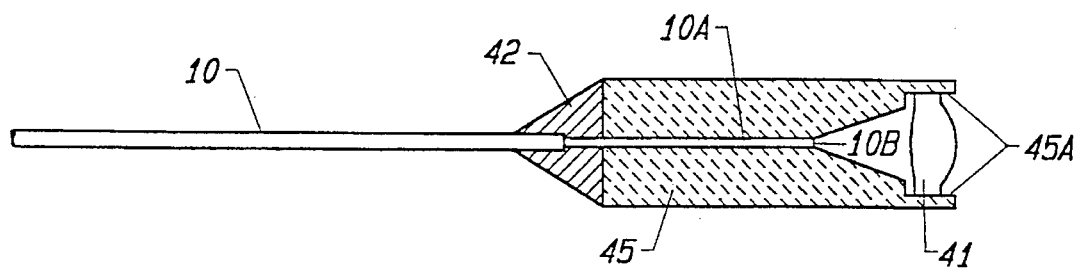
FIG. 6A is a detail cross-section of another embodiment of the present invention with aspheric lenses.
Figure 6B:
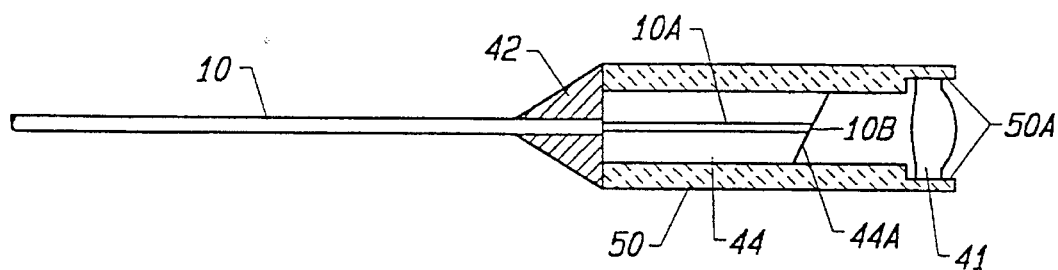
FIG. 6B is a cross-section is a detail of another embodiment with aspheric lenses.
Figure 6C:
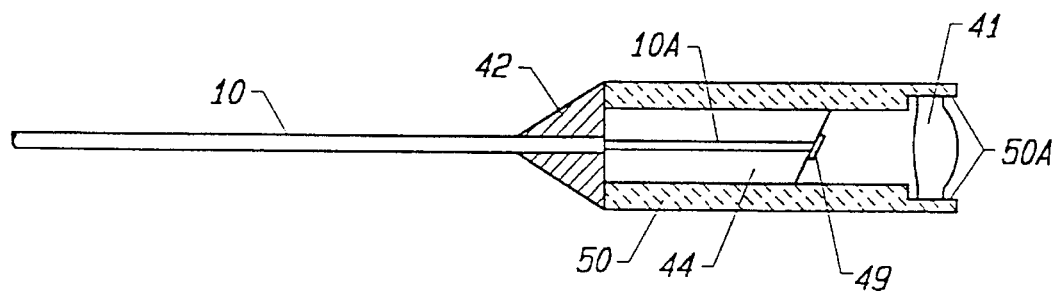
FIG. 6C illustrates a variation of the embodiment shown in FIG. 6B.

FIGS. 6A–6C illustrate various aspheric lens arrangements for each of the fibers 10 and 12. The fiber 10 is used as an example. In FIG. 6A a cylindrical glass? holder 45 has an opening along its central longitudinal axis. The unjacketed portion 10A of the fiber 10 fits into one end of the opening which fits snugly around the portion 10A to the fiber end 10B. The fiber 10 is held in place by epoxy 42 at the end of the holder opening. The end 10B of the fiber 10 is cut perpendicularly to the axis of the fiber and opening. The other end of the opening expands into a portion 45A to hold an aspheric lens 41 so that its optical axis is aligned with the longitudinal axes of the ferrule opening and the fiber 10. To match the diameters at the fiber end 10B and the portion 45A, the holder opening is cone-shaped. The location of the end 10B is at the focal length of the aspheric lens 41. A light signal from the fiber 10A is collimated by the lens 41. Conversely, a collimated light signal from the opposite direction is focused at the fiber end 10B. To increase light transmission, both facets of the aspheric lens 41 are coated with anti-reflection material.

Another arrangement is shown in FIG. 6B. Here, a cylindrical glass ferrule 44 with a central axial opening receives the unjacketed end portion of the fiber 10A. The ferrule 44 and the end of the fiber 10B are slant polished at a slight angle θ, 8° to 12°, from perpendicularity to the longitudinal axis of the fiber 10. A hollow cylindrical holder 50 is shaped to hold the ferrule 44 and aspheric lens 41. The inside diameter of one portion of the holder 50 snugly fits the outside diameter of the ferrule 44 and the inside diameter of the another portion 50A is set to hold the lens 41. As in the previous arrangement, the fiber end 10B is placed at the focal point of the aspherical lens 41 and its optical axis is aligned with the longitudinal axes of the ferrule opening and the fiber 10. Epoxy 42 at one end of the ferrule 44 sets the fiber 10, the ferrule 44 and holder 50. The slanted end face 44A of the ferrule 44 and both facets of the aspheric lens 41 covered with anti-reflection coating to increase light transmission.

The arrangement illustrated in FIG. 6C is similar to the arrangement of FIG. 6B. In place of anti-reflection coating on the slanted end face 44A of the ferrule 44, a window element 49 is coated with anti-reflection coating and placed on the end face 44A over the fiber end 10B, as explained previously with respect to FIG. 4.

Figure 7A:
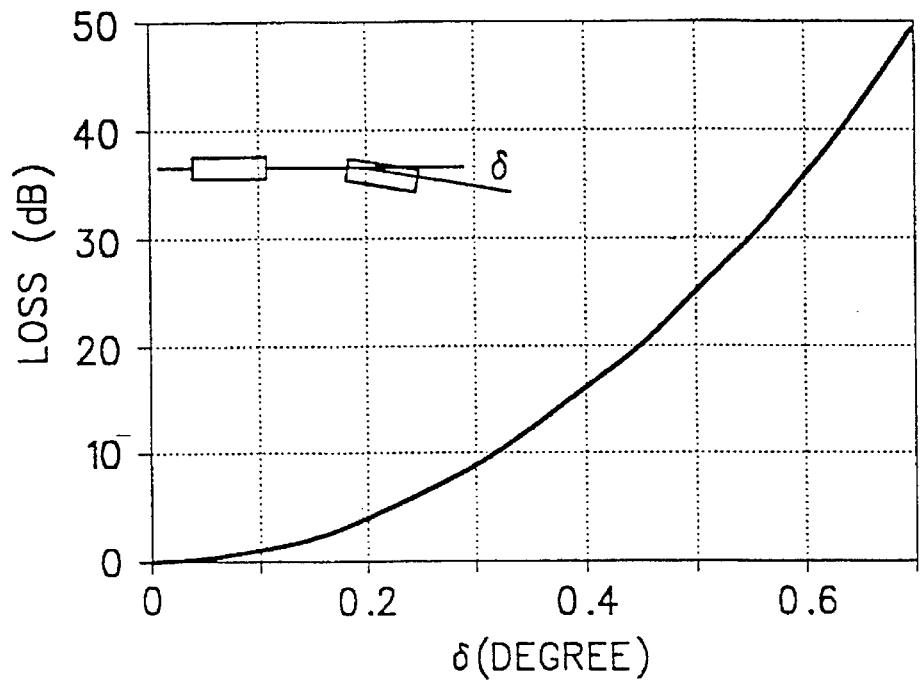
FIG. 7A is a graph of the loss versus angular misalignment of a pair of aligned optical fibers in FIG. 3.
Figure 7B:
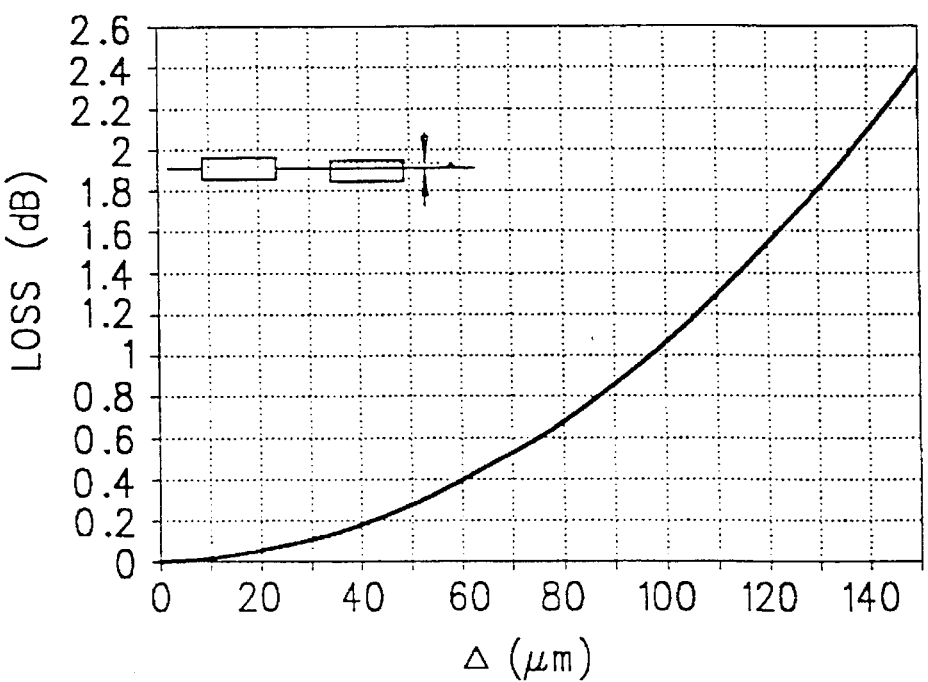
FIG. 7B is a graph of the loss versus displacement misalignment of a pair of aligned optical fibers in FIG. 3.

The results of the present invention are shown by the graphs in FIGS. 7A and 7B. The graph of FIG. 7A plots the insertion loss versus the angular misalignment angle, δ. As might be expected, the insertion loss is sensitive to angular misalignment from the collimation of the light signals between GRIN lenses 21 and 23, and relatively insensitive to displacement misalignment.

While the above is a complete description of the preferred embodiments of the present invention, various alternatives, modifications and equivalents may be used. It should be evident that the present invention is equally applicable by making appropriate modifications to the embodiment described above. For instance, while the described 1×N optical switch describes arrangements of optical fibers with all GRIN lens or all aspheric lens, it is readily apparent that combinations of GRIN lens and aspheric lens are possible. For example, a GRIN lens could be used with the first optical fiber and aspheric lenses with the N optical fibers, or an aspheric lens with the first fiber and GRIN lenses used with the N optical fibers. Therefore, the above description should not be taken as limiting the scope of invention which is defined by the metes and bounds of the appended claims.

What is claimed is:

1. An optical switch comprising:

a first optical fiber having a longitudinal axis and an end surface;

a first collimating lens having a longitudinal axis coincident with the longitudinal axis of the first optical fiber and a surface adjacent to the end surface of the first optical fiber;

a drive mechanism which supports the first collimating lens and which changes an angular orientation of the first collimating lens about an axis of rotation, the axis of rotation being at an angle to the longitudinal axis of the first optical fiber so that the longitudinal axis of the first collimating lens is radially oriented relative to the axis of rotation;

a plurality of N second collimating lenses, each second collimating lens having a longitudinal axis and a surface, the axes of the second collimating lenses being arranged radially about the axis of rotation so that the longitudinal axis of each second collimating lens is parallel to the longitudinal axis of the first collimating lens when the first collimating lens is adjacent to that second collimating lens, coupling of the first and second collimating lenses being sensitive to angular misalignment and insensitive to displacement misalignment therebetween; and a plurality of N optical fibers, each having a longitudinal axis coincident with an optical axis of an associated second collimating lens and an end surface adjacent to the surface of the associated second collimating lens.

2. An optical switch as claimed in claim 1, wherein the first optical fiber comprises a single mode fiber.

3. An optical switch as claimed in claim 2, wherein each of the plurality of N optical fibers comprises a single mode fiber.

4. An optical switch as claimed in claim 1, further comprising a window mounted to the end surfaces of each of the optical fibers, the window covering the end surface of the optical fiber, the window coated with antireflection material.

5. An optical switch as claimed in claim 1 wherein each of the first collimating lens and the plurality of N collimating lenses comprises a GRIN lens, and wherein the surface of each of the GRIN lenses is displaced from the end surfaces of the associated optical fiber and by a predetermined gap so that Fabry-Perot interference is minimized.

6. An optical switch as claimed in claim 5, wherein the gap is greater than 0.05 mm.

7. An optical switch comprising:

a first optical fiber having a longitudinal axis and an end surface;

a first collimating lens having a longitudinal axis coincident with the longitudinal axis of the first optical fiber and a surface adjacent to the end surface of the first optical fiber;

a drive mechanism which supports the first collimating lens and which changes an angular orientation of the first collimating lens about an axis of rotation;

a plurality of N second collimating lenses, each second collimating lens having a longitudinal axis and a surface, the axes of the second collimating lenses being arranged radially substantially along the switch plane about the axis of rotation so that the longitudinal axis of each second collimating lens is parallel to the longitudinal axis of the first collimating lens when the first collimating lens is adjacent to that second collimating lens; and a plurality of N optical fibers, each having a longitudinal axis coincident with an optical axis of an associated second collimating lens and an end surface adjacent to the surface of the associated second collimating lens;

wherein each of the first and the plurality of N collimating lenses comprises a GRIN lens, wherein the end surface of each of the first optical fiber and the plurality of N optical fibers is at a slant relative to a plane perpendicular to the longitudinal axis of the fiber, and wherein the surface of each of the first collimating lens and the plurality of N collimating lenses is at a reciprocal slant with respect to a plane perpendicular to the lens longitudinal axis so that each surface is parallel with the associated end surface.

8. An optical switch comprising:

a first optical fiber having a longitudinal axis and an end surface;

a first collimating lens having a longitudinal axis coincident with the longitudinal axis of the first optical fiber and a surface adjacent to the end surface of the first optical fiber;

a drive mechanism which supports the first collimating lens and which changes an angular orientation of the first collimating lens about an axis of rotation;

a plurality of N second collimating lenses, each second collimating lens having a longitudinal axis and a surface, the axes of the second collimating lenses being arranged radially substantially along the switch plane about the axis of rotation so that the longitudinal axis of each second collimating lens is parallel to the longitudinal axis of the first collimating lens when the first collimating lens is adjacent to that second collimating lens; and a plurality of N optical fibers, each having a longitudinal axis coincident with an optical axis of an associated second collimating lens and an end surface adjacent to the surface of the associated second collimating lens;

wherein the end surfaces and the surfaces are slanted with respect to the plane perpendicular to the longitudinal axes at an angle in the range of 8° to 12°.

9. An optical switch comprising:

a first optical fiber having a longitudinal axis and an end surface;

a first collimating lens having a longitudinal axis coincident with the longitudinal axis of the first optical fiber and a surface adjacent to the end surface of the first optical fiber;

a drive mechanism which supports the first collimating lens and which changes an angular orientation of the first collimating lens about an axis of rotation;

a plurality of N second collimating lenses, each second collimating lens having a longitudinal axis and a surface, the axes of the second collimating lenses being arranged radially substantially along the switch plane about the axis of rotation so that the longitudinal axis of each second collimating lens is parallel to the longitudinal axis of the first collimating lens when the first collimating lens is adjacent to that second collimating lens; and a plurality of N optical fibers, each having a longitudinal axis coincident with an optical axis of an associated second collimating lens and an end surface adjacent to the surface of the associated second collimating lens;

wherein each of the first collimating lens and the plurality of N collimating lenses comprises a GRIN lens having a length of 0.23 pitch.

10. A method for switching an optical signal, the method comprising:

transmitting an optical signal from a first optical fiber to a first collimating lens;

expanding and collimating the optical signal with the first collimating lens;

aligning the end of the first optical fiber and the first collimating lens with one of a plurality of N second collimating lenses to focus the optical signal on an end surface of an associated second optical fiber, the first collimating lens and the one of N second collimating lenses being accurately angularly aligned, and the first collimating lens and the one of N second collimating lenses reducing sensitivity to displacement misalignment; and rotating the end of the first optical fiber and the first collimating lens about an axis of rotation to angularly align the first collimating lens with another of the plurality of N second collimating lenses so as to focus the optical signal on an end surface of another second optical fiber.

11. A method as claimed in claim 10, wherein the optical signal is transmitted along the first optical fiber and along the plurality of N optical fibers in a single mode.

12. A method as claimed in claim 10, wherein the transmitting and focussing steps each comprise passing the optical signal through an antireflection coated window covering the end surfaces of each of the optical fibers.

13. A method as claimed in claim 10, wherein the expanding and focussing steps each comprise passing the optical signal through a GRIN lens, and wherein the transmitting and focussing steps further comprise passing the optical signal across a predetermined gap to minimize Fabry-Perot interference.

14. A method for switching an optical signal, the method comprising:

transmitting an optical signal from a first optical fiber to a first collimating lens;

expanding and collimating the optical signal with the first collimating lens;

aligning the end of the first optical fiber and the first collimating lens with one of a plurality of N second collimating lenses to focus the optical signal on an end surface of an associated second optical fiber; and rotating the end of the first optical fiber and the first collimating lens about an axis of rotation to angularly align the first collimating lens with another of the plurality of N second collimating lenses so as to focus the optical signal on an end surface of another second optical fiber;

wherein the transmitting step comprises passing the optical signal out a slanted end of first optical fiber and into a slanted surface of the first collimating lens, and wherein the focussing step comprises passing the optical signal out a slanted surface of each second collimating lens and into a slanted end of the associated optical fiber, each end and surface slanted with respect to a plane perpendicular to a longitudinal axis of the lens, and wherein the expanding and collimating step comprising passing the optical signal through a GRIN lens.

15. A method for switching an optical signal, the method comprising:

transmitting an optical signal from a first optical fiber to a first collimating lens;

expanding and collimating the optical signal with the first collimating lens;

aligning the end of the first optical fiber and the first collimating lens with one of a plurality of N second collimating lenses to focus the optical signal on an end surface of an associated second optical fiber; and rotating the end of the first optical fiber and the first collimating lens about an axis of rotation to angularly align the first collimating lens with another of the plurality of N second collimating lenses so as to focus the optical signal on an end surface of another second optical fiber;

wherein the expanding and focussing steps each comprise passing the optical signal through a 0.23 pitch GRIN lens.

* * * * *